(12) United States Patent
de Varax et al.

(10) Patent No.: US 6,371,694 B1
(45) Date of Patent: Apr. 16, 2002

(54) VESSEL FOR LAYING RIGID PIPES AT GREAT DEPTH

(75) Inventors: Hervé de Varax, Paris (FR); John Duncan Cruickshank, Woodlands of Durris (GB)

(73) Assignee: Coflexip (FR)

( * ) Notice: Subject to any disclaimer, the term of this patent is extended or adjusted under 35 U.S.C. 154(b) by 0 days.

(21) Appl. No.: 09/452,696

(22) Filed: Dec. 2, 1999

(30) Foreign Application Priority Data

Apr. 30, 1999 (FR) .............................. 99 05508

(51) Int. Cl.⁷ ................................. F16L 1/12
(52) U.S. Cl. .................... 405/168.3; 405/158
(58) Field of Search ................ 405/158, 159, 405/166, 168.1, 168.2, 168.3

(56) References Cited

U.S. PATENT DOCUMENTS

| 4,820,082 | A | * | 4/1989 | Reclade ........................ 405/168 |
| 5,348,423 | A | * | 9/1994 | Maloberti et al. ........... 405/166 |
| 5,464,307 | A | | 11/1995 | Wilkins |
| 5,527,134 | A | * | 6/1996 | Reclade ..................... 405/168.3 |

FOREIGN PATENT DOCUMENTS

| FR | 2660402 | 10/1991 |
| FR | 2773603 | 7/1999 |
| GB | 2025566 | 2/1983 |
| GB | 2287518 | 9/1995 |
| GB | 2296956 | 7/1998 |

OTHER PUBLICATIONS

"Specification for Unbonded Flexible Pipe", API Specification 17J, First Edition, Dec. 1996, American Petroleum Institute, 49 pp.
"Recommended Practice for Flexible Pipe", API Recommended Practice 17B (RP17B), First Edition, Jun. 1, 1988, American Petroleum Institute, 37 pp.
"Recommended Practice for Design and Operation of Subsea Production Systems", API Recommended Practice 17A (RP17A), First Edition, Sep. 1, 1987, American Petroleum Institute, 86 pp.

* cited by examiner

Primary Examiner—David Bagnell
Assistant Examiner—Jennifer R. Dougherty
(74) Attorney, Agent, or Firm—Ostrolenk, Faber, Gerb & Soffen, LLP

(57) ABSTRACT

A vessel for laying rigid tubular pipes has two vertically upright wheels for storing tubular pipe which is wound with plastic deformation. An inclinable laying davit is arranged approximately above a moon pool. An arched chute deflects the pipe at the top of the davit, followed down the davit by a pipe-straightener and tensioner. The mid-planes of the two adjacent wheels face approximately towards the davit, and the mid-planes intersect in the vertical longitudinal mid-plane of the vessel.

18 Claims, 2 Drawing Sheets

FIG_1

VESSEL FOR LAYING RIGID PIPES AT GREAT DEPTH

BACKGROUND OF THE INVENTION

The present invention relates to a vessel for laying underwater rigid tubular pipes and flexible pipes intended, in particular, for offshore oil production.

The person skilled in the art makes a distinction between flexible pipes and rigid pipes. Specifications API 17B and 17J by the American Petroleum Institute can be referred to for a definition of flexible pipes, and specification API 17A can be referred to for a definition of rigid pipes. It is simply recalled that flexible pipes have a minimum bend radius without damage (often termed MBR) which is relatively small (for example a few meters) while as opposed to rigid pipes have a minimum bend radius without plastic deformation which is relatively large (for example several tens of meters). Furthermore, for the purpose of the description below, the general term flexible pipes will be used to encompass not only flexible tubular pipes in their strictest sense, but also flexible risers, umbilicals and flexible cables that a laying vessel may have to lay.

Laying systems for rigid pipes are described in API 17A and for flexible pipes are described in API 17B.

In the case of rigid pipes, a distinction is made between two types of laying, depending on whether the sections of pipe are welded at sea (stove piping) or welded on land (reeled pipe).

The first type of laying itself has three main subdivisions, S-lay, J-lay and G-lay.

According to the S-lay technique, the sections of pipe are assembled horizontally on the deck of the vessel and they are made to follow an S-shaped path with a very large radius of curvature so as to prevent any plastic deformation. The pipe leaves the vessel at a very oblique angle, with the aid of an inclined trough known as a stinger. This technique is suited only to shallow and moderate laying depths because otherwise the weight of the string of pipe already laid would run the risk of bending and plastically deforming the pipe at the point where it leaves the stinger. This is why other techniques have had to be developed for greater depths of water.

According to the J-lay technique, the sections of pipe are assembled on a vertical or very slightly inclined davit on the laying vessel, the sections thus being welded together in the direction in which the pipe is laid, which avoids any plastic deformation at this stage, the assembled pipe then being immersed to a great depth, still without plastic deformation. Examples are illustrated in document U.S. Pat. No. 5,464,307 or in French application 98/00148 in the name of the assignee company.

According to the G-lay technique, illustrated, for example, in document GB 2 287 518 A, sections of pipe are assembled horizontally on the deck of the vessel as in the S-lay technique; the pipe formed is sent towards the bow of the vessel then is returned aft by a large wheel which introduces plastic deformation into the pipe, after which this pipe passes through straighteners and a series of multi-track caterpillar tensioners and is then dropped into the water with a certain inclination which can be chosen according to the depth of water so as to avoid plastically deforming the pipe in the submerged part. According to one alternative form disclosed in GB 2 296 956 A, the pipe, previously assembled from sections on the deck, is sent over an arched chute placed at the top of an inclinable ramp equipped with tensioners or clamping jaws; the two inflexions that the pipe undergoes lead to plastic deformation of the pipe and make it necessary to employ straighteners. The rate of laying using the G-lay technique is relatively slow.

The second type of laying for rigid pipes, using sections welded together on land, comprises the so-called reeled pipe system illustrated, for example, in GB 2 025 566 A, where the pipe, which has been welded together as a long length (in excess of 1 km for example) on the dockside and wound with plastic deformation onto a vertical reel (which may be as much as 15 to 20 m in diameter) located on the laying vessel, is unwound from the reel, again with plastic deformation, and passes through a straightener-reeler before being taken up by the tracked-caterpillar conveyors of an inclinable laying ramp provided in a zone where the pipe enters the water at the stern of the vessel and the inclination of which is chosen according to the laying depth. This technique does, however, have limitations in terms of the depth achieved. At the present time, the sea beds being exploited are often at depths in excess of 2000 m, which demands that a considerable length of rigid pipe be carried on board. This is something of which existing vessels are incapable.

In the case of flexible pipes, a distinction is also made between two types of laying: the horizontal laying system (HLS), the application of which is soon limited to shallow laying depths; and the vertical laying system (VLS). FR 2 660 402 A in the name of the assignee company discloses such VLS-type laying from the central well (moon pool) of a laying vessel. The pipe is unwound from a storage basket and sent over a chute which guides it in a circular arc (termed, in common parlance, a "camembert") located at the top of a vertical derrick of modest height surmounting the moon pool and supporting two multi-track caterpillar tensioners which clamp and move the pipe along continuously. This system is well suited to flexible pipes (even though the depths reached are currently about 1700 m), that is to say the pipes which can adopt a fairly pronounced curvature both in the storage basket and over the return chute and on the intermediate portions of the caternary-curve-shaped part. By contrast, this system is not suitable for rigid pipes which cannot withstand such curvatures or in which such curvatures lead to permanent deformation.

As can thus be seen, the current laying ships are not suited to the laying of rigid and flexible pipes. A ship for laying reeled rigid pipe can be used for laying flexible pipe but this means of laying is not optimized for the laying of flexible pipe (the radius of curvature given to the flexible pipe during laying is far greater than the minimum bend radius of the flexible pipe). It is also possible to use the system described in French patent application 98/00148, but the J-lay davit has to be modified for laying the flexible pipe. Admittedly, there are some laying ships (for example SEAWAY FALCON and MAXITA) which can lay both rigid and flexible pipes, but the laying means on this type of ship are independent (there is one davit for laying rigid pipe and another for laying flexible pipe).

SUMMARY OF THE INVENTION

The object of the invention is to propose a vessel for laying reeled rigid pipe which allows laying at very great depths (particularly 2500 m and over) without running into the limitations hitherto encountered. Another object is to propose a vessel capable of combining the reeled pipe system with the system (VLS) used for laying flexible pipe by sharing the same laying means, and even that of the rigid-pipe J-lay system.

The objective of the invention is achieved using a vessel for laying rigid tubular pipes, of the type comprising means of storing tubular pipe wound with plastic deformation on vertical reels, an inclinable laying davit arranged approximately over a zone at which the pipe enters the water, an arched chute for deflecting the pipe at the top of the davit, and pipe-straightening means and tensioners arranged on the davit, characterized in that the storage means are in the form of two adjacent vertical wheels of very large dimensions facing approximately towards the davit, the mid-planes of the wheels intersecting in the vertical longitudinal mid-plane of the vessel.

The invention solves the problem of increasing the capacity of the vessel for storing wound rigid pipe in an original way. Rather than increasing the dimensions of a single storage wheel in proportions which would make it difficult to control (for example, a wheel weighing 500 tons presents problems of rotational inertia and demands substantial reeling means), the invention proposes to arrange two adjacent storage wheels in a particular orientation, which makes it possible not only to control the problems of rotational inertia, but also to dispense with reeling means for unwinding the wound rigid pipe especially if, as is preferred, the deflecting chute can itself be directed towards one or other of the wheels. For this purpose, the top of the davit is mounted in such a way as to allow sufficient pivoting to each side of the longitudinal mid-plane of the vessel, for example by about 15°, and to do so when the davit is vertical or inclined by an angle which may be as much as 60° to the horizontal. The pivoting top of the davit contains the straightening means (preferably at three points) so that the straightening of the unwound rigid pipe always occurs in a correct orientation without introducing additional false twist due to the angular position of the vertical storage wheels (that is to say plastic deformation in a plane different from the normal plane of curvature of the wound pipe).

The mid-planes of the wheels ideally intersect at the point where the rigid pipe enters the straightening means of the davit. As this davit is of variable inclination (between 60° and 90°), it may be envisaged for the angular position of the wheels to be adjustable according to the laying angle, using appropriate means for supporting and orienting the hubs of the wheels. In a simplified version, the wheels are given a fixed orientation corresponding to the ideal position for an average laying angle (75°) which, in one exemplary configuration, amounts to making the mid-planes of the wheels intersect forward of the zone at which the pipe enters the water, approximately in the region of the top of the deflecting chute (when the davit is in a vertical position). In practice, the wheels then make an angle of about 5° with respect to the mid-plane of the vessel.

In addition to the advantages already mentioned, the fact of having two storage wheels makes it possible to halve the time taken, on the quayside, to load the wheels and makes it possible to store different pipes on each of the wheels, for example pipes of different diameters.

According to the invention, the zone at which the pipe enters the water is a moon pool located roughly at the center of the vessel. At the moon pool there is an independent table comprising a clamp. This clamp is able to hold the string of pipe while accessories are affixed to the pipes or while two sections of pipe are being connected. This clamp can also be used as a static clamp for J-laying. For this purpose, a special-purpose ramp for J-laying is attached to the davit. The aft deck is used for preparing sections of rigid pipe. J-laying is carried out using a mobile carriage mounted on the special-purpose ramp and operated by the abandonment and recovery winch, and using the static clamp.

Naturally, the vessel also has a well for the passage of an underwater laying robot.

To allow the vessel the desired multi-functionality, flexible-pipe storage baskets are provided on the vessel, and the davit also has, at its upper end, a chute for flexible pipe. The davit can therefore be used for laying flexible pipe using the VLS technique. Furthermore, enough space is provided at the laying table at the base of the davit for affixing various accessories (vertebras, buoys, etc.). The stern of the vessel is also large enough to accommodate a great deal of tackle and equipment needed for preparing the pipes.

BRIEF DESCRIPTION OF THE DRAWINGS

The invention will be clearly understood and other features and advantages of the invention will emerge from reading the description which follows, which is given with reference to the appended drawings in which.

DESCRIPTION OF THE PREFERRED EMBODIMENTS

Figure 1:
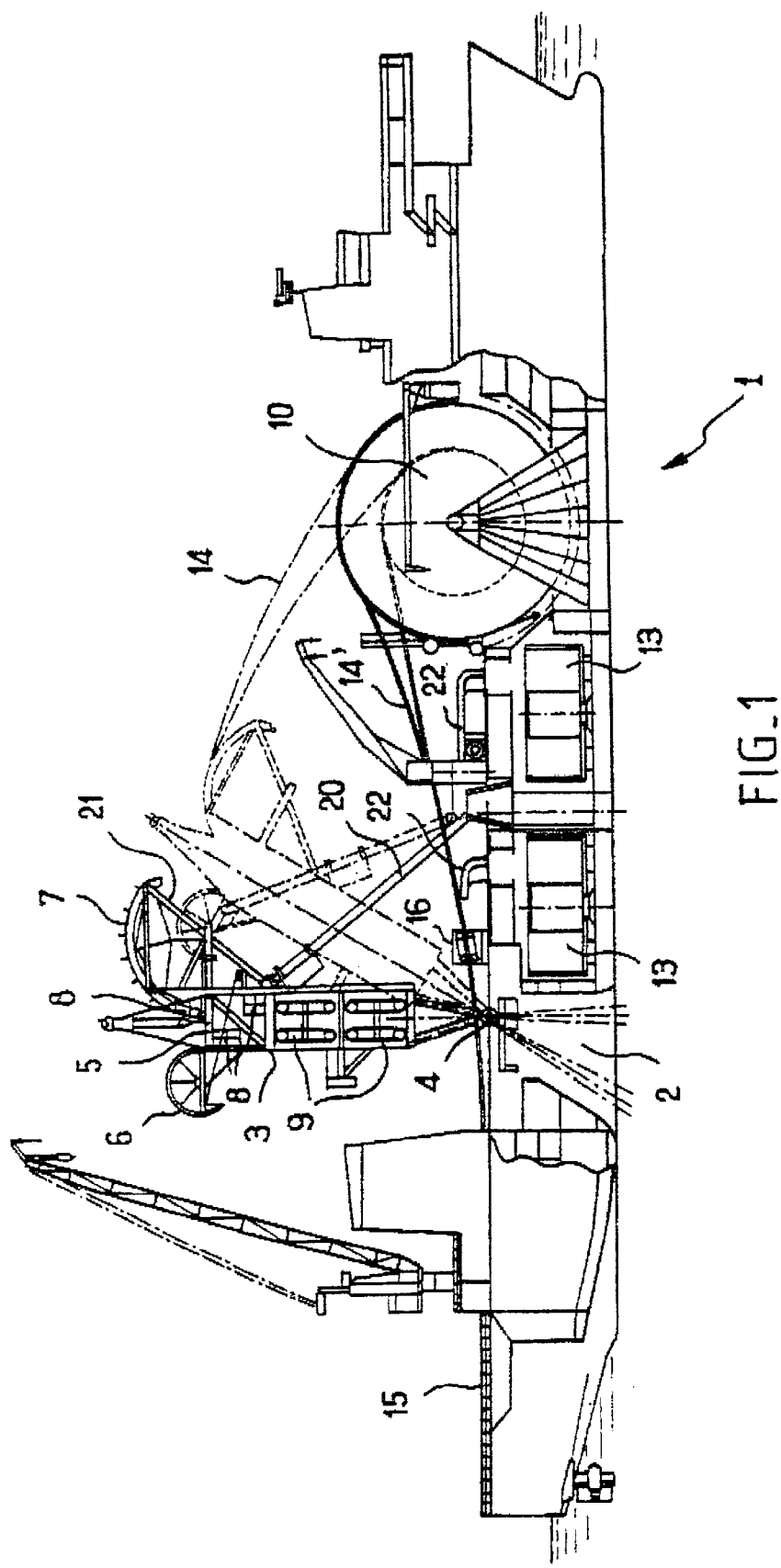
FIG. 1 is a side view with partial cutaway of a laying vessel according to the invention.

The laying vessel 1, about 230 m long, comprises, in its sternmost third, a central moon pool 2 above which there rises a laying davit 3 articulated at its base at 4 (near the upper deck) in such a way that it can adopt positions which are inclined towards the bow of the vessel, such as the position depicted in dotted line in FIG. 1, using a rack-and-pinion system 20.

The davit 3, which rises to some 50 m, has an upper module 5 about 15 m tall which can turn with respect to the lower part, about the axis of the davit 3. Mounted on this module 5 are, on the one hand, a small chute 6 for guiding the flexible pipe and, on the other hand, a large arched chute 7 for deflecting a rigid pipe. The large chute 7, about 11 m long, is supported by a bracket 21 resting on the upper module 5 and is designed to lead the unwound rigid pipe into a three-point straightening assembly 8 arranged in the pivoting upper module 5 of the davit, which three-point assembly is followed, in the downstream direction, by a group of two four-track-caterpillar tensioners 9. From the moment it enters the straightening device, the pipe is oriented in the laying direction.

Forward of the moon pool 2, by about 80 m, are two large vertical wheels 10, with a capacity of 2500 tons, formed of a hub measuring about 20 m and of cheeks about 31 m in diameter, for a width of slightly more than 5 m. The wheels are mounted so that they can rotate in a conventional way on spherical roller bearings and are driven by rack-and-pinion systems. According to the invention, the wheels are arranged symmetrically with respect to the longitudinal axis XX of the vessel, and face towards the davit 3, ideally at the point where the rigid pipe enters the three-point straightening device 8 of the davit. In the configuration shown in the drawing, the wheels are of fixed orientation and the lines 11 of their respective mid-planes intersect on the longitudinal axis XX of the vessel, forward of the moon pool 2, at a point 12 which is close to the foot of the projection of the top of the large chute 7 of the davit 3 when vertical.

Two baskets 13 with vertical axes, for storing flexible pipe or umbilical, with a capacity of 1500 tons (outside diameter of about 17 m) are also provided on the vessel 1, between the moon pool 2 and the wheels 10. Flexible-pipe return devices 22 are provided above the baskets to allow the flexible pipe to be wound into the baskets from the deck and unwound from the baskets 13 towards the deck and the guide chute 6.

Figure 2:
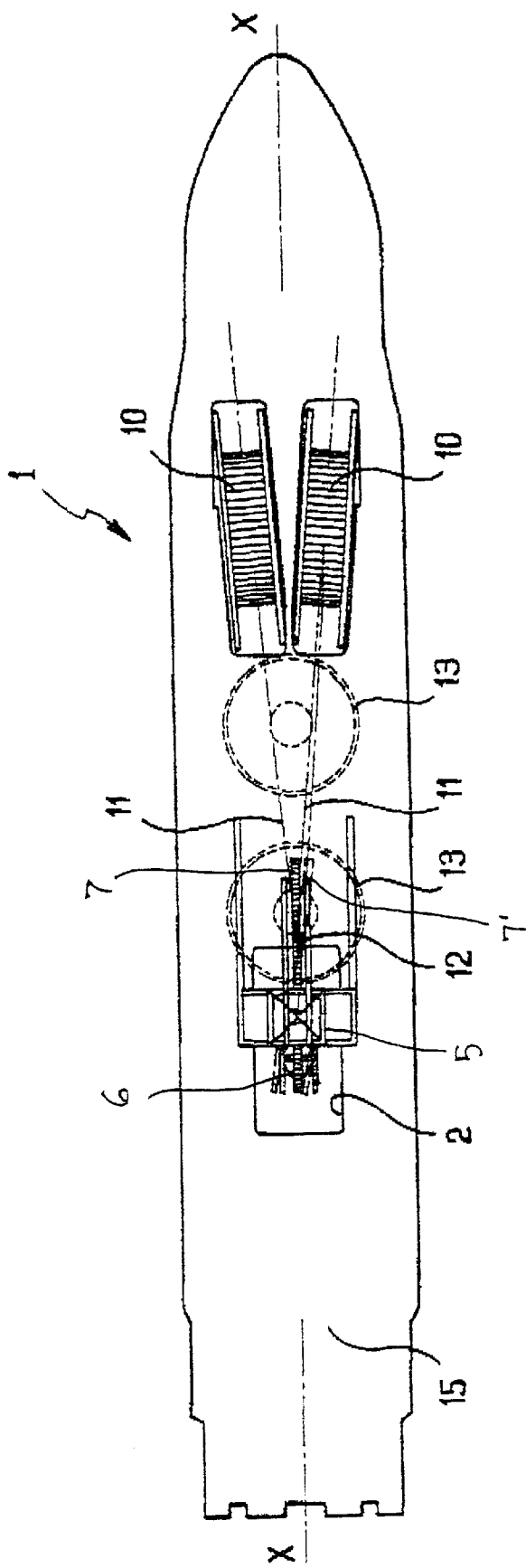
FIG. 2 is a very simplified view from above of the vessel of FIG. 1, looking essentially at the upper deck.

The rigid pipe 14 stored on one or other of the wheels 10 can be unwound from the wheel as shown in chain line in FIG. 1, the pipe passing over the large chute 7 then into the straighteners 8 and into the tensioners 9, after which it passes through the moon pool to join the laid string of pipe. The possibility of rotating the top 5 of the davit allows the large chute 7 and the three-point straightener 8 to be directed towards that one of the two wheels which is paying out, and this makes it possible to avoid imparting detrimental twist to the unwound pipe. FIG. 2 diagrammatically shows the davit (depicted as vertical) with its upper module 5 and the chute 7 in the central position and, in chain line referenced 7', depicts the same chute after the upper module has pivoted towards one of the wheels 10 (the lower one in the drawing).

Solid line 14' shows the rigid pipe being reeled onto one or other of the wheels 10 from the stern 15 of the vessel, when the vessel is dockside or even by assembly actually on deck, on account of the vast amount of space available. The pipe 14' passes over a reeling tensioner 16 located forward of the moon pool 2 and allowing the pipe to be wound uniformly onto the wheel. The tensioner 16 is mounted so that it can pivot in a heightwise direction so that it can adapt to the variable angle that the pipe 14' makes as it is gradually reeled onto the wheel 10.

What is claimed is:

1. A vessel for laying rigid tubular pipes, comprising:
   two vertically oriented wheels, each for storing tubular pipe wound with plastic deformation on the respective wheel,
   an inclinable laying davit for supporting the pipe to be laid in a direction to avoid lateral plastic deformation,
   an arched chute at the top of the davit for deflecting the pipe to be laid, and
   a pipe-straightener followed by tensioners arranged down along the davit,
   wherein the storage wheels are adjacent to each other and have respective mid-planes directed approximately toward the davit, the mid-planes of the wheels intersecting in the vertical longitudinal mid-plane of the vessel.

2. The vessel as claimed in claim 1, wherein the deflecting chute is directable to face toward one or other of the wheels.

3. The vessel as claimed in claim 2, wherein the davit includes an upper module which is capable of pivoting about the upright axis of the davit and the deflecting chute and the straightener are mounted on the upper module.

4. The vessel as claimed in claim 2, wherein the mid-planes of the wheels intersect near a point where the pipe stored on either of the wheels enters the straightener of the davit upon being unwound from the respective wheel.

5. The vessel as claimed in claim 2, wherein the vessel has a water-entering zone at which the pipe to be laid enters the water and the mid-planes of the wheels intersect forward of the water-entering zone of the vessel.

6. The vessel as claimed in claim 5, wherein the water-entering zone is a moon pool.

7. The vessel as claimed in claim 5, wherein the mid-planes of the wheels intersect in the region of the top of the chute when the davit is in a vertical position.

8. The vessel as claimed in claim 2, further comprising a support enabling orienting the wheels so as to enable the angular position of the wheels to be adjusted.

9. The vessel as claimed in claim 1, wherein the mid-planes of the wheels each form an angle of about 5° to the longitudinal axis of the vessel.

10. The vessel as claimed in claim 1, further comprising a support enabling orienting of the wheels to enable the angular position of the wheels to be adjusted.

11. The vessel as claimed in claim 1, further comprising baskets on the vessel for storing flexible pipe.

12. The vessel as claimed in claim 11, wherein the davit comprises a flexible-pipe return chute.

13. The vessel as claimed in claim 1, wherein the davit comprises a flexible-pipe return chute.

14. The vessel as claimed in claim 1, wherein the two wheels are arranged symmetrically to each other with respect to the vertical longitudinal mid-plane of the vessel.

15. The vessel as claimed in claim 1, wherein the two wheels have the same diameter.

16. The vessel as claimed in claim 1, further comprising a water-entering zone at which the pipe to be laid enters the water, wherein the inclinable laying davit is arranged approximately over the water-entering zone.

17. The vessel as claimed in claim 16, wherein the water-entering zone is a moon pool.

18. The vessel as claimed in claim 1, wherein the vessel has a water-entering zone at which the pipe to be laid enters the water and the mid-planes of the wheels intersect forward of the water-entering zone of the vessel.

* * * * *